US009660881B2

(12) United States Patent
Chaudhuri et al.

(10) Patent No.: US 9,660,881 B2
(45) Date of Patent: May 23, 2017

(54) METHOD AND SYSTEM FOR DETERMINING SIGNAL PENETRATION OF ONE OR MORE NEIGHBOR BASE STATIONS

(71) Applicants: Saptarshi Chaudhuri, Bangalore (IN); Avijit Manna, Kolkata (IN); Shyam Sundar Pal, Kolkata (IN)

(72) Inventors: Saptarshi Chaudhuri, Bangalore (IN); Avijit Manna, Kolkata (IN); Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 84 days.

(21) Appl. No.: 14/748,080

(22) Filed: Jun. 23, 2015

(65) Prior Publication Data
US 2016/0285709 A1    Sep. 29, 2016

(30) Foreign Application Priority Data

Mar. 28, 2015    (IN) .......................... 1606/CHE/2015

(51) Int. Cl.
*H04L 12/26*    (2006.01)
*H04W 4/02*    (2009.01)

(52) U.S. Cl.
CPC ............. *H04L 43/06* (2013.01); *H04W 4/025* (2013.01)

(58) Field of Classification Search
None
See application file for complete search history.

(56) References Cited

U.S. PATENT DOCUMENTS

| 8,478,280 | B1* | 7/2013 | Ji | H04W 24/00 455/446 |
|---|---|---|---|---|
| 8,862,134 | B1 | 10/2014 | Zhou | |
| 2010/0167719 | A1* | 7/2010 | Sun | H04W 36/0088 455/423 |

(Continued)

FOREIGN PATENT DOCUMENTS

WO    WO 02/103918 A2    12/2002

OTHER PUBLICATIONS

Ericsson et al., "Proposes solution for eCoMP", 3GPP TSG-RAN3 Meeting #84, pp. 1-7 (2014).

(Continued)

*Primary Examiner* — Charles C Jiang
*Assistant Examiner* — Saad Khawar
(74) *Attorney, Agent, or Firm* — Finnegan, Henderson, Farabow, Garrett & Dunner, LLP

(57) ABSTRACT

A method and system for determining signal penetration of one or more neighbor base stations is disclosed. The method comprises: receiving one or more measurement reports from one or more UEs associated with a serving base station, wherein the one or more measurement reports comprise signal strength values of the one or more neighbor base stations; identifying a location of each of the one or more UEs based on the one or more measurement reports; determining a distance between one or more pairs of UEs based on the location of the each UE; defining one or more penetration areas based on the one or more distances between the one or more pairs of UEs; and determining signal penetration in the one or more penetration areas based on the one or more pairs of UEs associated with each of the penetration areas.

18 Claims, 4 Drawing Sheets

(56) References Cited

U.S. PATENT DOCUMENTS

| | | | |
|---|---|---|---|
| 2011/0256833 A1 | 10/2011 | Racz et al. | |
| 2012/0071160 A1* | 3/2012 | Das | H04W 48/16 |
| | | | 455/434 |
| 2015/0094114 A1 | 4/2015 | Rao et al. | |
| 2015/0141027 A1* | 5/2015 | Tsui | H04W 52/243 |
| | | | 455/452.1 |

OTHER PUBLICATIONS

Extended European search report from the European Patent Office for counterpart European Application No. EP 15 19 6497 dated Aug. 2, 2016.

* cited by examiner

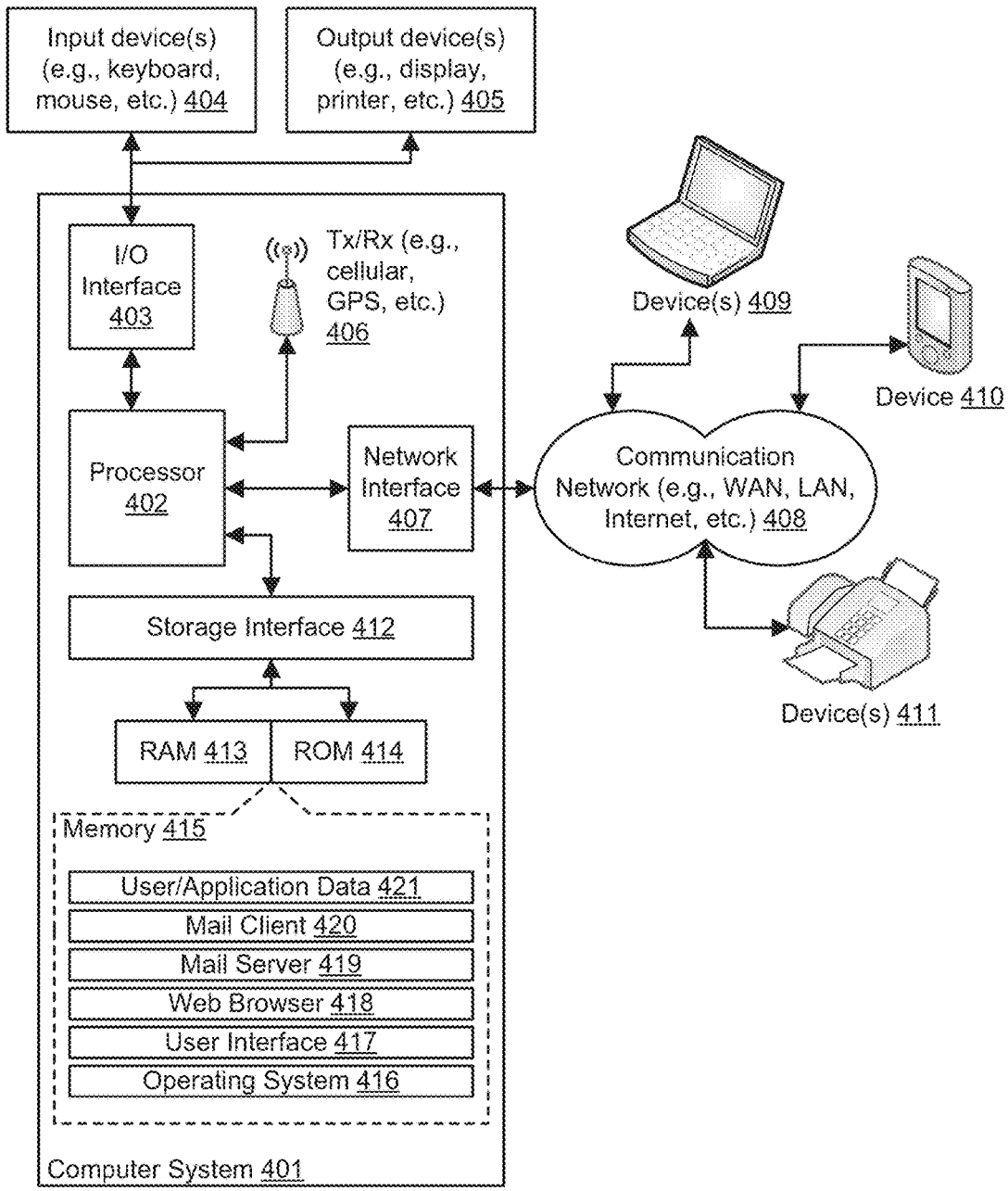
FIG. 4: Example Computer System

METHOD AND SYSTEM FOR DETERMINING SIGNAL PENETRATION OF ONE OR MORE NEIGHBOR BASE STATIONS

PRIORITY CLAIM

This U.S. patent application claims priority under 35 U.S.C. §119 to: India Application No. 1606/CHE/2015, filed Mar. 28, 2015. The aforementioned applications are incorporated herein by reference in their entirety.

TECHNICAL FIELD

This disclosure relates generally to signal coverage of base stations, and more particularly to a method and system for determining signal penetration of one or more neighbor base stations into coverage area of a serving base station.

BACKGROUND

In a broadband wireless network, several base stations may be deployed to provide the desired service coverage to end users using mobile User Equipment (UE). The base stations provide the signal coverage or cell coverage over an area based on the transmitting power of the base station. Some limitations which impact the end user service quality may include "call continuity" and "call quality" which are impacted by "cell coverage" and "signal level". Hence, inadequate "cell coverage" and improper "signal level" may impact end user service quality and cost of operations.

To meet the above need, base stations may be deployed such that there is some overlapped area so that proper handover takes place in order to maintain call continuity and hence service quality. Typically, the overlap zones are designed initially based on standard mechanisms. However, actual field of the network, actual overlap zones and extent of coverage may be impacted based on factors like landscape (obstruction, reflections etc.) and operating environment (noise, humidity, wind, etc.). This may lead to unwanted penetration of signal into neighbouring base station's coverage area and also may lead to above or below threshold-overlap-coverage among neighbouring base stations.

SUMMARY

In one embodiment, a method of determining signal penetration of one or more neighbor base stations is disclosed. The method comprises: receiving one or more measurement reports from one or more User Equipment (UEs) associated with a serving base station, wherein the one or more measurement reports comprise Reference Signal Received Power (RSRP) values of the one or more neighbor base stations; identifying a location of each of the one or more UEs based on the one or more measurement reports; determining a distance between one or more pairs of UEs based on the location of the each UE; defining one or more penetration areas based on the one or more distances between the one or more pairs of UEs, wherein the one or more penetration areas are associated with the one or more neighbor base stations; and determining, by the signal penetration computing device, signal penetration in the one or more penetration areas based on the one or more pairs of UEs associated with each of the penetration areas.

In another embodiment, a signal penetration computing device for determining signal penetration of one or more neighbor base stations is disclosed. The signal penetration computing device comprises a processor; and a memory communicatively coupled to the processor, wherein the memory stores processor-executable instructions, which, on execution, cause the processor to: receive one or more measurement reports from one or more User Equipment (UEs) associated with a serving base station, wherein the one or more measurement reports comprise Reference Signal Received Power (RSRP) values received by UEs of the one or more neighbor base stations; identify a location of each of the one or more UEs based on the one or more measurement reports; determine a distance between one or more pairs of UEs based on the location of the each UE; define one or more penetration areas based on the one or more distances between the one or more pairs of UEs, wherein the one or more penetration areas are associated with the one or more neighbor base stations; and determine signal penetration in the one or more penetration areas based on the one or more pairs of UEs associated with each of the penetration areas.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
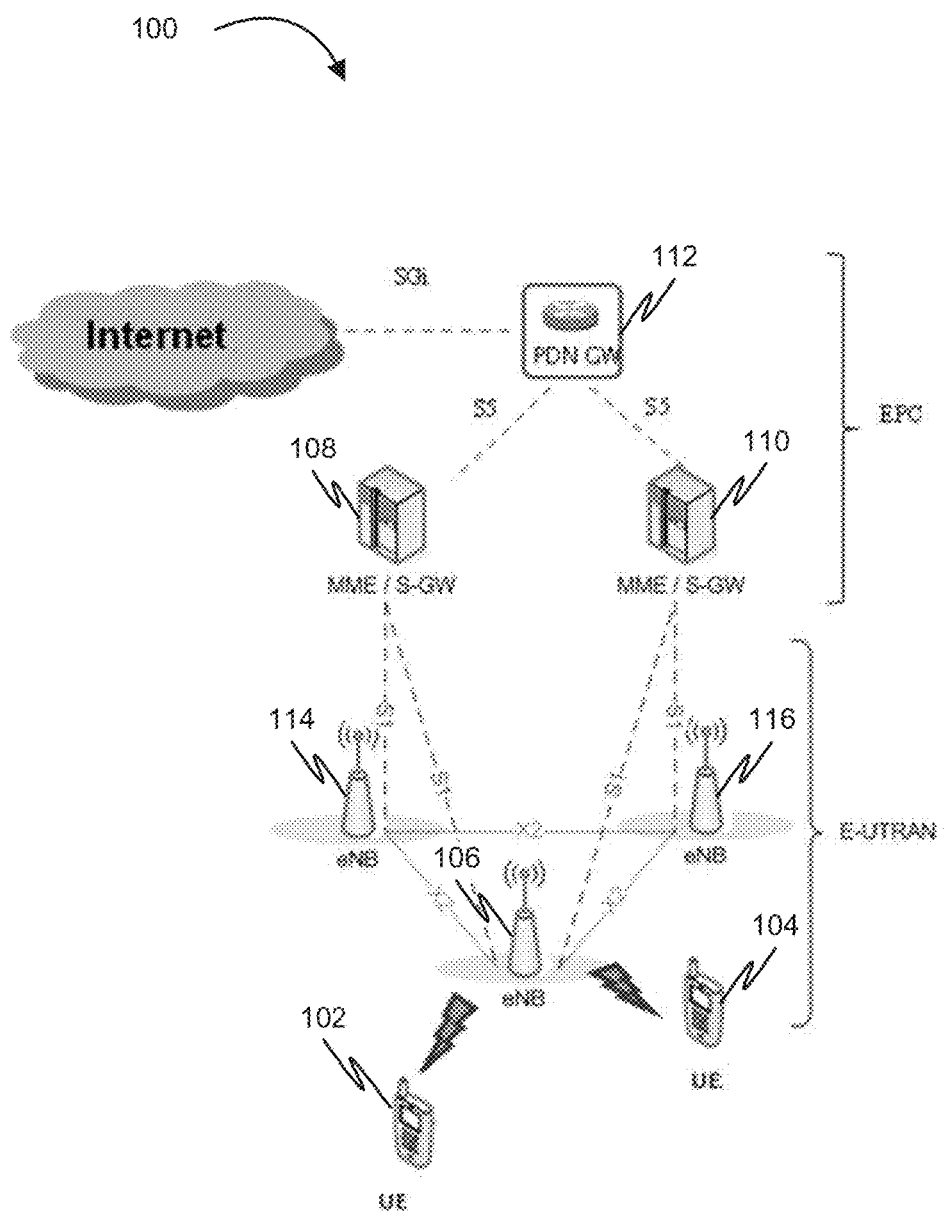
FIG. 1 illustrates an exemplary broadband wireless network architecture in which various embodiments of the present disclosure may function.

An exemplary high level network 100 depicting a broadband wireless network architecture is illustrated in FIG. 1. For purposes of illustration, the network 100 corresponds to an LTE network. However, the depicted LTE network is merely an exemplary network, and thus it will be understood that the teachings of the disclosure contemplate other broadband wireless networks such as WiMax, High Speed Packet Access (3GPP's HSPA), etc.

In FIG. 1, one or more user equipment (UE) such as UE 102 and UE 104 may communicate wirelessly with a Base Station (BS) 106 that is an LTE base station. In this case, BS 106 acts as the serving BS for both UE 102 and UE 104. The functionalities of BS 106 may include Radio Resource Management (RRM), header compression and encryption of user data stream, packet scheduling and transmission, physical layer processing, etc. An example of a UE may be a cell phone, PDA, tablet computer, etc. The BS 106 may communicate with an evolved packet core (EPC) that may include a Mobility Management Entity (MME) associated with a serving gateway (S-GW). The MME and the S-GW are represented together in FIG. 1 as MME/S-GW 108 and MME/S-GW 110 for the sake of simplicity. However, it is to be noted that the MME and the S-GW in some embodiments may be separate and distinct entities. The MME manages and stores UE context and further generates temporary identities and allocates them to UEs. The SGW routes and forwards user data packets, while also acting as the mobility anchor for the user plane during inter-BS handovers and as the anchor for mobility between LTE and other 3GPP technologies. Network 100 may further include a Packet Data Network Gateway (PDN GW) 112 that provides connectivity to UE 102 and UE 104 to external packet data networks by being the point of exit and entry of traffic for UE 102 and UE 104. A UE may have simultaneous connectivity with more than one PDN GW for accessing multiple PDNs. The PDN GW performs policy enforcement, packet filtering for each user, charging support, lawful Interception, etc.

In addition to the serving BS 106, network 100 may further include neighboring BSs such as a BS 114 and a BS 116. It is to be noted that, while only BS 114 and BS 116 are illustrated as neighbors in FIG. 1 for sake of simplicity, serving BS 106 may have any number of neighbors. The serving BS 106 may maintain a neighbor relation table (NRT) that provides information corresponding to neighboring BSs. The NRT may be used by serving BS 106 to determine which neighbor to handover a UE to. BS 106 may discover neighbor BS 116 using an Automatic Neighbor Relation (ANR) function. Here, the serving BS 106 may receive measurement reports from all UEs currently served by the BS 106, that is, from UE 102 and UE 104. The measurement reports may include various signal strength measurements between the UE and a number of BSs in the vicinity of the UE. In this case, UE 104 may detect a signal from BS 116 and accordingly provide this information to serving BS 106. The serving BS 106 may check its own NRT to verify if BS 116 has been added as a neighbor. On determining that BS 116 is not on the NRT, serving BS 106 may update the NRT to include the discovered neighbor BS 116.

Figure 2:
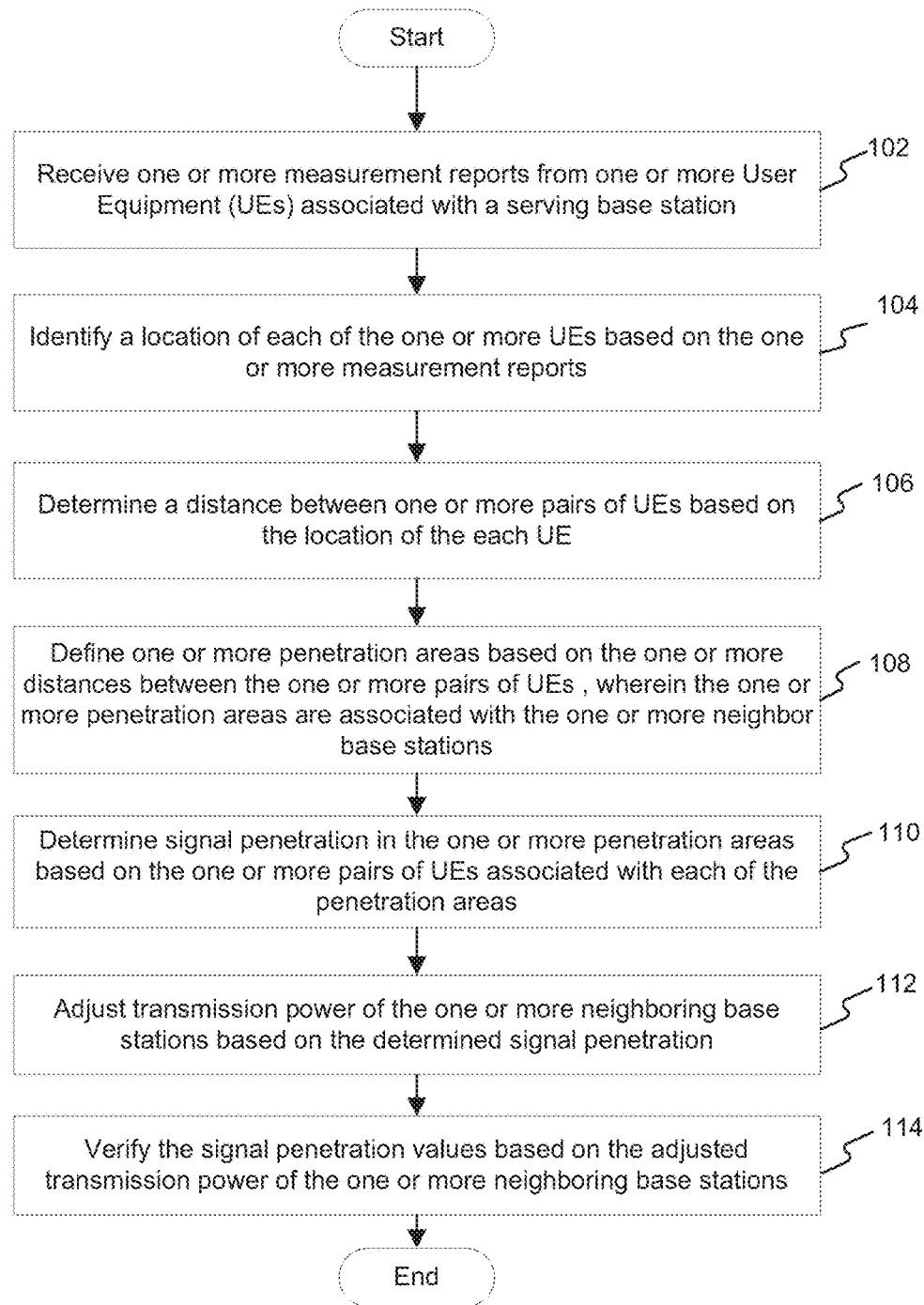
FIG. 2 illustrates a flow chart of a method of determining signal penetration of one or more neighbor base stations according to some embodiments of the present disclosure.

FIG. 2 illustrates a flow chart of a method of determining signal penetration of one or more neighbor base stations into the coverage area of a serving base station in accordance with some embodiments of the invention. At step 102, a signal penetration computing device may receive one or more measurement reports from one or more User Equipment (UEs) associated with a serving Base Station (BS). Here, the one or more UEs may be currently served by the serving BS. The one or more measurement reports may include, among other parameters, a signal strength measurement of BSs neighboring the serving base station. In some embodiments, the signal strength measurements may correspond to Reference Signal Received Power (RSRP) values. The UEs measure the RSRP values of neighboring BSs while being served by the serving base station and provide this information to the serving base station. In some embodiments, the RSRP values of the neighboring BSs as measured by the UEs may be compared with a predefined RSRP threshold value. The measurements that exceed the predefined RSRP threshold may be considered for subsequent steps. If a UE measured RSRP value of a particular neighbor BS is below the RSRP threshold, then that UE may not be considered for determining signal penetration of that particular neighbor BS. Thus, one or more neighbor BSs may be filtered from consideration in case the RSRP values of the one or more neighbor BSs are below a predefined the predefined RSRP threshold.

On receiving the measurement reports from the various UEs, a location of each UE may be identified based on the measurement reports at step 104. The Global Navigation Satellite System (GNSS) location included in the measurement reports may be used to determine the location of the UEs. In some embodiments, the coverage area of the serving BS may be divided into sectors and the location of each UE may be determined within a corresponding sector. The coverage area of the serving BS may be divided into different sectors to account for the signal transmission strength of the serving BS being different in different directions.

Thereafter, at step 106, a distance between one or more pairs of UEs may be determined based on the location of the UEs. In other words, a distance between a first UE and each of the other UEs from which measurement reports were received is determined. Distances between a particular UE and all other UEs may be determined based on the locations of the UEs. For example, if there are four UEs, then a distance between the first UE and the second UE, distance between the first UE and the third UE, and distance between the first UE and the fourth UE may be determined. Similarly, a distance between the second UE and the third UE and distance between the second UE and fourth UE may be determined. This may be done until distances between all pairs of UEs are determined. Each such UE may be considered a measurement point.

On determining distances between possible pairs of UEs, one or more penetration areas may be defined at step 108. A penetration area in this context may be formed by three or more measurement points. If the distance between any two measurement points is below a predefined distance threshold distance, then those measurement points may be considered as candidates for defining a penetration area. A penetration area may be a triangular or quadrangular shape area defined by three or more measurement points or UEs. The three or more measurement points may be selected to form a penetration area if the distance between each pair of UEs that make up the three or more measurement points is less than the predefined distance threshold. The one or more penetration areas may be associated with the one or more neighboring BSs, that is, each penetration area may correspond to a signal penetration from a particular neighbor BS. Since each UE receives RSRP values from various neighboring BSs, the RSRP values for a particular neighbor as measured by various UEs may be used to define a penetration area for that particular neighboring BS. In case there are no UEs in certain areas of the coverage areas and hence no measurement reports associated with such areas, the signal penetration of neighboring BSs may be predicted from the measurement reports of UEs in close proximity to the areas where no UEs are present.

Upon determining the one or more penetration areas associated with the one or more neighboring BSs, signal penetration of the one or more neighboring BSs in these penetration areas is determined at step 110. The signal penetration of the various neighbor BSs may be determined based on the RSRP values of the various neighbor BSs measured by the UEs that form the vertices of the one or more penetration areas. The signal penetration from the neighboring BSs into the coverage area of the serving BS may be determined by using a path loss method for each of the vertices that make up a particular penetration area. In other words, the signal penetration of a particular neighboring BS may be determined using path loss method on the RSRP values of the particular neighboring BS measured by the UEs that make up the penetration area for which the signal penetration is to be determined.

In some embodiments, once the signal penetration of the neighboring BSs are determined, the transmission signal power values of the neighboring BSs may be adjusted in order to minimize the signal penetration into the coverage area of the serving BS at step 112. The transmission signal value may be corrected based on a comparison between the actual signal penetration determined and the expected signal penetration as given by:

$$BS_{power\_\Delta} = BS_{power\_expected} - BS_{power\_actual}$$

Once the transmission signal power of the neighboring BSs have been corrected, the signal penetration of the neighboring BSs may be verified by comparing the previously determined signal penetration with a current signal penetration (determined after correcting the neighboring BS's transmission power) at step 114. If the deviation is below a predefined error threshold, then the signal penetration value may be considered accurate.

Figure 3:
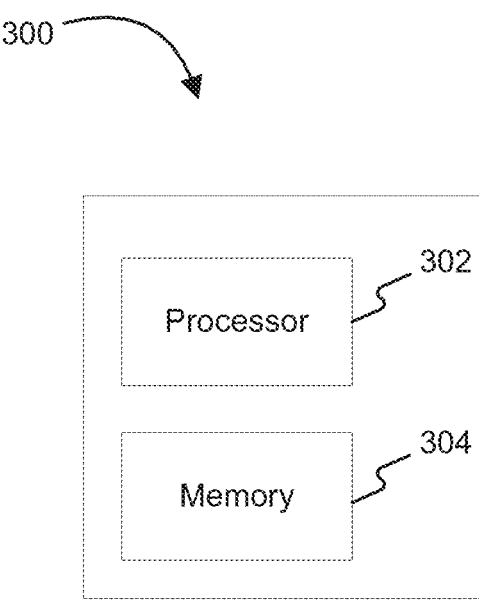
FIG. 3 is a functional block diagram of a signal penetration computation device according to some embodiments of the present disclosure.

A signal penetration computing device 300 for determining signal penetration of one or more neighbor base stations (BSs) will now be described with reference to FIG. 3. FIG. 3 illustrates a block diagram of signal penetration computing device 300 in accordance with some embodiments of the present disclosure. Signal penetration computing device 300 may include a processor 302 and a memory 304 communicatively coupled to processor 302, wherein memory 304 stores processor-executable instructions. The instructions, on execution, may cause processor 302 to receive one or more measurement reports from one or more User Equipment (UEs) associated with a serving BS. The one or more measurement reports may include, among other parameters, a signal strength measurement of BSs neighboring the serving base station. In some embodiments, the signal strength measurements may correspond to Reference Signal Received Power (RSRP) values. The UEs measure the RSRP values of neighboring BSs while being served by the serving base station and provide this information to signal penetration computing device 300. In some embodiments, processor 302 may compare the RSRP values of the neighboring BSs as measured by the UEs with a predefined RSRP threshold value. The measurements that exceed the predefined RSRP threshold may be considered for subsequent steps. If a UE measured RSRP value of a particular neighbor BS is below the RSRP threshold, then that UE may not be considered for determining signal penetration of that particular neighbor BS. Thus, one or more neighbor BSs may be filtered from consideration in case the RSRP values of the one or more neighbor BSs are below a predefined the predefined RSRP threshold.

On receiving the measurement reports from the various UEs, processor 302 may identify a location of each UE based on the measurement reports received from the UEs. In some embodiments, the coverage area of the serving BS may be divided into sectors and the location of each UE may be determined within a corresponding sector. The coverage area of the serving BS may be divided into different sectors to account for the signal transmission strength of the serving BS being different in different directions.

Processor 302 may then determine a distance between one or more pairs of UEs based on the location of the UEs. In other words, a distance between a first UE and each of the other UEs from which measurement reports were received is determined. Distances between a particular UE and all other UEs may be determined based on the locations of the UEs. Determining distances between pairs of UEs is explained in detail in conjunction with FIG. 2. On determining distances between possible pairs of UEs, processor 302 may define one or more penetration areas. A penetration area in this context may be formed by three or more measurement points as explained with reference to FIG. 2. If the distance between any two measurement points is below a predefined distance threshold distance, then those measurement points may be considered as candidates for defining a penetration area. A penetration area may be a triangular or quadrangular shape area defined by three or more measurement points or UEs. The three or more measurement points may be selected to form a penetration area if the distance between each pair of UEs that make up the three or more measurement points is less than the predefined distance threshold. Defining penetration areas associated with the one or more neighboring BSs is explained in detail in conjunction with FIG. 2. In case there are no UEs in certain areas of the coverage areas and hence no measurement reports associated with such areas, the signal penetration of neighboring BSs may be predicted from the measurement reports of UEs in close proximity to the areas where no UEs are present.

Upon determining the one or more penetration areas associated with the one or more neighboring BSs, processor 302 may determine signal penetration of the one or more neighboring BSs in these penetration areas. The signal penetration of the various neighbor BSs may be determined based on the RSRP values of the various neighbor BSs measured by the UEs that form the vertices of the one or more penetration areas. The signal penetration from the neighboring BSs into the coverage area of the serving BS may be determined by processor 302 using a path loss method for each of the vertices that make up a particular penetration area. In other words, the signal penetration of a particular neighboring BS may be determined using path loss method on the RSRP values of the particular neighboring BS measured by the UEs that make up the penetration area for which the signal penetration is to be determined.

Computer System

FIG. 4 is a block diagram of an exemplary computer system for implementing embodiments consistent with the present disclosure. Variations of computer system 401 may be used for implementing signal penetration computing device 300. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and system for determining signal penetration of one or more neighbor base stations. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of determining signal penetration of one or more neighbor base stations, the method comprising:
   receiving, by a signal penetration computing device, one or more measurement reports from one or more User Equipment (UEs) associated with a serving base station, wherein the one or more measurement reports comprise Reference Signal Received Power (RSRP) values of the one or more neighbor base stations;
   identifying, by the signal penetration computing device, a location of each of the one or more UEs based on the one or more measurement reports;
   determining, by the signal penetration computing device, a distance between one or more pairs of UEs based on the location of the each UE;
   defining, by the signal penetration computing device, one or more penetration areas based on the one or more distances between the one or more pairs of UEs being below a predefined distance threshold, wherein each of the one or more penetration areas is defined by location of three or more UEs and is associated with one of the one or more neighbor base stations; and
   determining, by the signal penetration computing device, signal penetration in the one or more penetration areas based on the one or more pairs of UEs associated with each of the penetration areas.

2. The method of claim 1, wherein the signal penetration in the one or more penetration areas is determined using a path loss method.

3. The method of claim 1 further comprising adjusting transmission signal values of the one or more neighbor base stations based on the signal penetration in the one or more penetration areas.

4. The method of claim 3 further comprising determining a deviation in the signal penetration by comparing the signal penetration before and after adjusting the transmission signal values of the one or more neighbor base stations.

5. The method of claim 4, further comprising verifying the signal penetration in the one or more penetration areas by comparing the deviation in signal penetration with a predefined error threshold.

6. The method of claim 1 further comprising filtering the one or more neighbor base stations based on the RSRP values of the one or more neighbor base stations.

7. The method of claim 1, wherein the distance between each UE pair within the three or more UEs is less than the predefined distance threshold.

8. The method of claim 1, further comprising predicting signal penetration for one or more locations where no UEs are present based on measurement reports associated with one or more UEs in proximity to the locations where no UEs are present.

9. A signal penetration computing device for determining signal penetration of one or more neighbor base stations, comprising:
   a processor; and
   a memory communicatively coupled to the processor, wherein the memory stores processor-executable instructions, which, on execution, cause the processor to:
      receive one or more measurement reports from one or more User Equipment (UEs) associated with a serving base station, wherein the one or more measurement reports comprise Reference Signal Received Power (RSRP) values received by UEs of the one or more neighbor base stations;
      identify, a location of each of the one or more UEs based on the one or more measurement reports;
      determine a distance between one or more pairs of UEs based on the location of the each UE;
      define one or more penetration areas based on the one or more distances between the one or more pairs of UEs being below a predefined distance threshold, wherein each the one or more penetration areas is defined by location of three or more UEs and is associated with one of the one or more neighbor base stations; and
      determine signal penetration in the one or more penetration areas based on the one or more pairs of UEs associated with each of the penetration areas.

10. The signal penetration computing device of claim 9, wherein the signal penetration in the one or more penetration areas is determined using a path loss method.

11. The signal penetration computing device of claim 9 further comprising instructions to filter the one or more neighbor base stations based on the RSRP values of the one or more neighbor base stations.

12. The signal penetration computing device of claim 9, wherein the distance between each UE pair within the three or more UEs is less than the predefined distance threshold.

13. The signal penetration computing device of claim 10, further comprising predicting signal penetration for one or more locations where no UEs are present based on measurement reports associated with one or more UEs in proximity to the locations where no UEs are present.

14. A non-transitory computer readable medium comprising a set of computer executable instructions, which, when executed on a computing system causes the computing system to perform the steps of:

receiving one or more measurement reports from one or more User Equipment (UEs) associated with a serving base station, wherein the one or more measurement reports comprise Reference Signal Received Power (RSRP) values of the one or more neighbor base stations;

identifying a location of each of the one or more UEs based on the one or more measurement reports;

determining a distance between one or more pairs of UEs based on the location of the each UE;

defining one or more penetration areas based on the one or more distances between the one or more pairs of UEs being below a predefined distance threshold, wherein each of the one or more penetration areas is defined by location of three or more UEs and is associated with one of the one or more neighbor base stations; and determining signal penetration in the one or more penetration areas based on the one or more pairs of UEs associated with each of the penetration areas.

15. The medium of claim 14, wherein the signal penetration in the one or more penetration areas is determined using a path loss method.

16. The medium of claim 14 further comprising instructions to filter the one or more neighbor base stations based on the RSRP values of the one or more neighbor base stations.

17. The medium of claim 14, wherein the distance between each UE pair within the three or more UEs is less than the predefined distance threshold.

18. The medium of claim 14, further comprising instructions to predict signal penetration for one or more locations where no UEs are present based on measurement reports associated with one or more UEs in proximity to the locations where no UEs are present.

* * * * *